(12) United States Patent
Eder et al.

(10) Patent No.: US 8,723,355 B2
(45) Date of Patent: May 13, 2014

(54) AUTONOMOUSLY OPERATED BUOYS WITH POWER GENERATION AND POWER USAGE CONTROL

(75) Inventors: James E. Eder, Doylestown, PA (US); Joseph A. Sarokhan, Basking Ridge, NJ (US)

(73) Assignee: Ocean Power Technologies, Pennington, NJ (US)

( * ) Notice: Subject to any disclaimer, the term of this patent is extended or adjusted under 35 U.S.C. 154(b) by 471 days.

(21) Appl. No.: 13/065,679

(22) Filed: Mar. 28, 2011

(65) Prior Publication Data
US 2012/0248865 A1 Oct. 4, 2012

(51) Int. Cl.
*B60L 1/00* (2006.01)
*B60L 3/00* (2006.01)
*H02G 3/00* (2006.01)
*F03B 13/00* (2006.01)
*H02P 9/04* (2006.01)

(52) U.S. Cl.
USPC .................. 307/9.1; 290/42; 290/43; 290/53; 290/54

(58) Field of Classification Search
None
See application file for complete search history.

(56) References Cited

U.S. PATENT DOCUMENTS

| | | | |
|---|---|---|---|
| 7,594,780 B2 * | 9/2009 | Bull | 405/195.1 |
| 2003/0001392 A1 * | 1/2003 | Gerber et al. | 290/42 |
| 2007/0232364 A1 * | 10/2007 | Troutman | 455/572 |

* cited by examiner

*Primary Examiner* — Jared Fureman
*Assistant Examiner* — Aqeel Bukhari
(74) *Attorney, Agent, or Firm* — Henry I. Schanzer, Esq

(57) ABSTRACT

Apparatus, intended to be deployed in a body of water, includes a payload comprised of a multiplicity of different electronic and electromechanical loads and a wave energy converter (WEC) system responsive to the amplitude of waves in the body of water for producing electrical power, which is a function of the wave amplitudes, to power the payload. The apparatus includes switching circuitry for controlling the application of power to selected ones of the loads. Control circuitry and devices which are responsive to the electric power being produced control the switching circuitry for controlling the amount of power supplied to, and consumed by, the loads.

30 Claims, 9 Drawing Sheets

AUTONOMOUSLY OPERATED BUOYS WITH POWER GENERATION AND POWER USAGE CONTROL

BACKGROUND OF THE INVENTION

This invention relates to the operability and survivability of autonomously operated wave energy converter (WEC) buoys intended to be deployed in a body of water for an extended period of time (e.g., 2-5 years) and having a payload intended to be operational during that time.

Each autonomous WEC buoy includes a payload which requires a substantial amount of electric power for its operation. The payload is comprised of multiple different "loads" including numerous pieces of electric/electronic equipment and electro mechanical devices such as, for example (and not by way of limitation), radar and/or sonar systems, various wave and/or climate sensors, communication systems and/or relays, various control systems and associated elements, and a braking system. In order to power and operate the payload, each WEC buoy includes a system for generating (electric) power in response to wave motion, which power can then be used to operate the payload.

Any wave energy converter (WEC) device suitable for converting the forces of ocean waves into useful forms of energy and power is of interest to produce the electric power needed. In the discussion below and in the appended claims the terms "WEc buoy", or just "buoy" and "WEC" are used interchangeably. Normally, the WEC portion of the buoy is used to power the payload and to charge, or recharge, batteries or any other suitable energy storage device for maintaining a constant supply of power to the load.

WECs are a renewable energy source, and are highly suited for use in autonomous buoy applications since they can operate without the need to re-supply the system with fuel, hydrogen or other stored energy reserves. Also, WEC buoys are of interest since wave energy has the necessary energy density for this to be feasible.

It is desirable and/or necessary for an autonomous WEC buoy and its associated equipment to remain deployed and operational for long periods of time regardless of the climatic conditions, while still providing a relatively constant electrical power to the payload. The need to provide constant electric power presents significant problems since the climatic conditions can vary greatly. At one climatic extreme, if the seas are calm (characterized by low amplitude waves) there will be little, if any, power generated. This presents a problem since the power requirements of the payload are continuous and provide a constant power drain. Thus, if the "calm" condition extends for a long period of time any energy stored will be depleted and the payload will be rendered non-operational. At the other extreme, under "storm" conditions, characterized by the amplitude of the waves exceeding a predetermined value, it is necessary to "lock-up" the buoy/WEC to prevent its destruction (ensure its survivability). In the lock-up condition the WEC produces no power. This also presents a problem since, as for the "calm" condition, certain power requirements of the payload are continuous and there is a constant power drain.

An additional problem is that the WECs typically consume a certain amount of "housekeeping" power defined as the power consumed to operate devices and equipment such as various electrical drives and rectifiers, solenoids and the like needed for the WEC to function. A problem is that for some operating conditions (e.g., low amplitude waves) the WEC consumes more power than it generates. The power consumed by the WEC for its housekeeping needs can use up all available stored energy, leaving little or none for the payload.

Still another problem relates to the deployment of a large array of WECs over an extended area of water. It is required that the WEC power delivery system operate autonomously without the need for operator intervention and be capable of providing in-situ continuous electrical power to operate sensors and relatively low power payloads.

As already noted, a problem exists in that the power generation system may not be able to provide the power to keep the batteries charged (e.g., due to adverse wave conditions; i.e., their amplitude is too low or too high) and power supplied to the payload. As a result, the equipment and devices associated with the buoy become inoperative and the status of the buoy may be compromised.

A need exists for deploying a payload which includes diverse sensing and communications equipment that can detect, track and communicate information to other sites or installations, located onshore or offshore, designed to assess the information. A WEC buoy can be used for providing power to the payload. However, a problem exists where it is extremely important that the payload remain operational for an extended period of time even when the wave conditions are such that the WEC is not generating power.

SUMMARY OF THE INVENTION

Applicants' invention resides, in part, in the recognition of the problem that there are situations where the power dissipation of a limited source of energy needs to be monitored, controlled and managed and, in part, in apparatus and methods for managing the power distribution and power consumption of the available electric power of an autonomous WEC buoy. According to one aspect of the invention, an energy conversion system embodying the invention includes apparatus for modifying the payload's power requirements to match the system's energy capture in an effort to extend the available power and operability of the payload under adverse conditions.

Another feature of a system embodying the invention is that it can operate completely autonomously; optimizing its settings to the wave climate and manage its available energy reserves.

An autonomous wave energy converter (WEC) system embodying the invention may be housed in, or be part of, a buoy and, as used herein, the terms "WEC buoy", "buoy" and "WEC" may be used interchangeably. Note any known WEC may be used to practice the invention. Numerous sensors and electrical devices and equipment define as the individual "loads" of the payload may be mounted on or about the WEC/buoy.

Systems embodying the invention may include means for selectively connecting and/or disconnecting selected loads (particular devices and/or equipment) from the WEC's power source and means for operating the system in different operational modes to manage power consumption as a function of climatic conditions (e.g., wave amplitude) and/or selected external conditions (e.g., need for quiet for some surveillance conditions).

A still further feature of a system embodying the invention is the inclusion of an on-board satellite radio to allow the WEC (and/or the buoy of which it is part) to communicate with a command center so its operational status can be ascertained and, if necessary, it's autonomous operating parameters over-ridden. The on-board radio also allows for communication between the sensors and responders and the command center; for controlling the payload as well as receiving telemetry data.

A WEC embodying the invention may include; (a) a float and a spar which move relative to each other in response to the waves; (b) a power-take-off device (PTO) coupled between the float and spar to convert their relative motion into electrical energy; and (c) a brake system to selectively inhibit the relative motion between the float and the spar. In accordance with the invention, the brake system may be activated, for example, and among others, to; (a) minimize the system's overhead electrical draw for periods where low wave activity do not justify full operation of all of the WEC's sub-systems; or (b) eliminate acoustic noise which may interfere with a selected sensor's operation; or (c) lock the float and spar under storm conditions. The decision to activate the brake system may be aided by a sea state sensor, coupled to the WEC, which, typically, draws extremely low power (e.g., less than one 1 Watt) and is used to detect wave conditions which are sufficient to justify operation. This allows the wave energy conversion subsystem to minimize its own power draw while providing continuous power to the electrical payload. The sea state sensor can be any suitable device including, without limitation, an on-board accelerometer or a load cell positioned in the load path of the disclosed mechanical brake.

If the energy storage sub-system takes the form of batteries, the batteries may be arranged in a redundant topology so that the failure of one battery in the array does not compromise the system's ability to deliver power to the payload.

In extreme cases, where wave energy conditions are poor, the system can also adjust the payload's duty cycle for power delivery to less than 100%. It can coordinate with the payload so this reduction in power has minimal impact on the sensor's mission.

All of the WEC's key systems may be monitored by an on-board controller. The controller has a program which embeds all control algorithms necessary for autonomous operation, control of the payload and communication with a command center.

An aspect of the invention is that it incorporates one, or more, "sea state" sensors (or monitors) into the system to monitor the present wave climate without paying the incremental "housekeeping" loads associated with power generation. The sea state sensors, along with a control algorithm, allow the system to autonomously determine an optimum configuration of the system to maximize the net energy extracted from the waves.

The sea state sensors can take many different forms including, but not limited to, the following:
a) a force sensor disposed between a braking device and one or more of the WEC's moving bodies (e.g., float and spar) to monitor the force communicated from wave action through the brake; or
b) a displacement sensor disposed between two or more of the WEC's moving bodies (e.g., float and spar) to monitor their relative motion; or
c) an accelerometer mounted on one or more of the WEC's floating moving bodies to determine the motions induced on the body by wave action; or
d) A method of monitoring the back EMF voltage of the generator without active control to determine the level of wave activity; or
e) Other conventional wave sensors deployed in the vicinity of the system. Data from these sensors is sent to the system via radio communications.

BRIEF DESCRIPTION OF THE DRAWINGS

In the accompanying drawings, which are not drawn to scale, like reference characters denote like components.

DETAILED DESCRIPTION OF THE INVENTION

An aspect of the invention is directed to improving the operability of an autonomously operated WEC buoy and its survivability: (a) over an extended period of time and (b) as a function of different climatic conditions. A particular concern is to ensure and extend the operability of the WEC and its payload even when the wave conditions are such that power is not being generated. To appreciate the problems of concern note, for example, that the WEC buoys of the invention may be part of a large number of WECs deployed along and over a very large body of water covering a very large area. A requirement of such a WEC buoy system is to generate electrical power from wave action, store excess energy in a battery bank and deliver a constant level of electrical power to a payload which may include numerous electrical/electronic transponders, surveillance and monitoring devices. It is therefore important that each WEC can survive and operate reliably for a long period of time (preferably several years) without the need for maintenance or refueling (recharge). Each WEC buoy is meant to function primarily autonomously, without connection to any external power source, so as to minimize the amount of required operator interaction; although it can be controlled via one or more radio connections.

For purpose of illustration, a power generating system using one type of WEC will first be described. Referring to FIGS. 1, 1A, 1B, 2, 3 and 4 there is shown a WEC 10 which is intended to be placed in a body of water subjected to wave motion of varying amplitude and frequency. The WEC includes two major wave responsive components, a float 100 and a spar 200. The float is designed to move generally in phase with the waves and the spar is designed to be stationary, or to move either generally out-of-phase with respect to the waves or in a delayed manner with respect to the float. Thus, in response to the waves in a body of water in which the WEC is positioned, there is relative motion between the float 100 and spar 200. A power-take-off device (PTO) 500 is coupled between the float and the spar and converts their relative motion into electrical energy.

Figure 7:
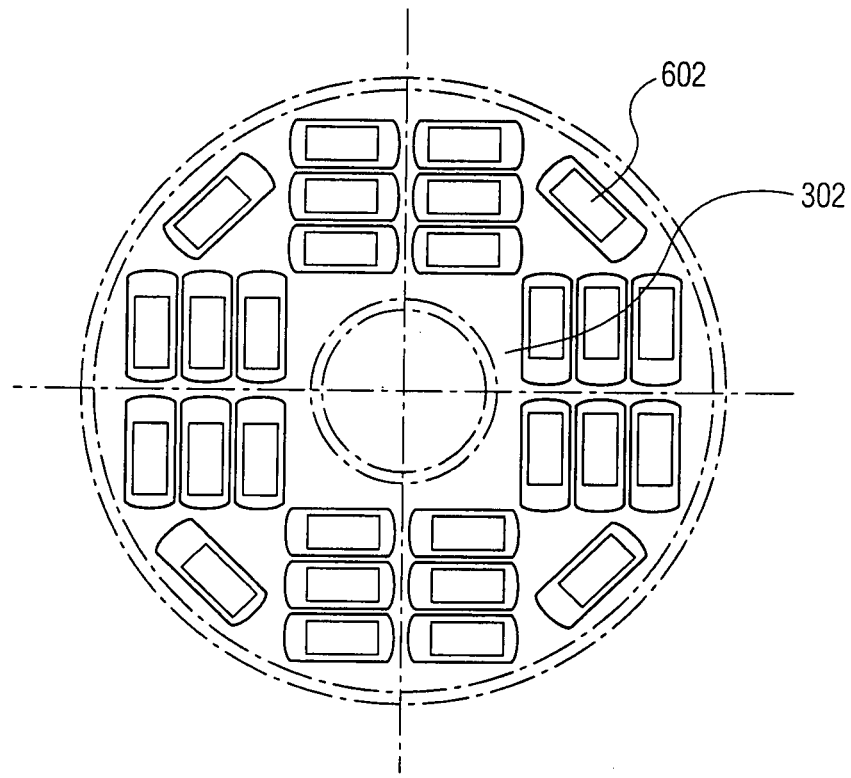
FIG. 7 is a simplified top view of an array of batteries for use in practicing the invention.

A heave plate, 300, which may be made of any suitable material (e.g., steel), is shown attached to the bottom submerged portion of the spar. The heave plate provides a substantial amount of "added" mass to the spar, allowing it to remain relatively fixed or to move generally out of phase with the waves. This "added" mass is only partly due to the mass of the material comprising the heave plate 300; much of this "added" mass is due to the entrained water which is moved or pushed up and down by the heave plate. In systems embodying the invention, a battery storage chamber 302 may be placed on, or within, the heave plate 300, and/or be part thereof, to provide additional mass to the spar (see also FIG. 7 showing the placement of batteries 602). This mass is in addition to the "added" mass of the water surrounding the heave plate. The total mass added to the spar is thus increased.

Figure 1:
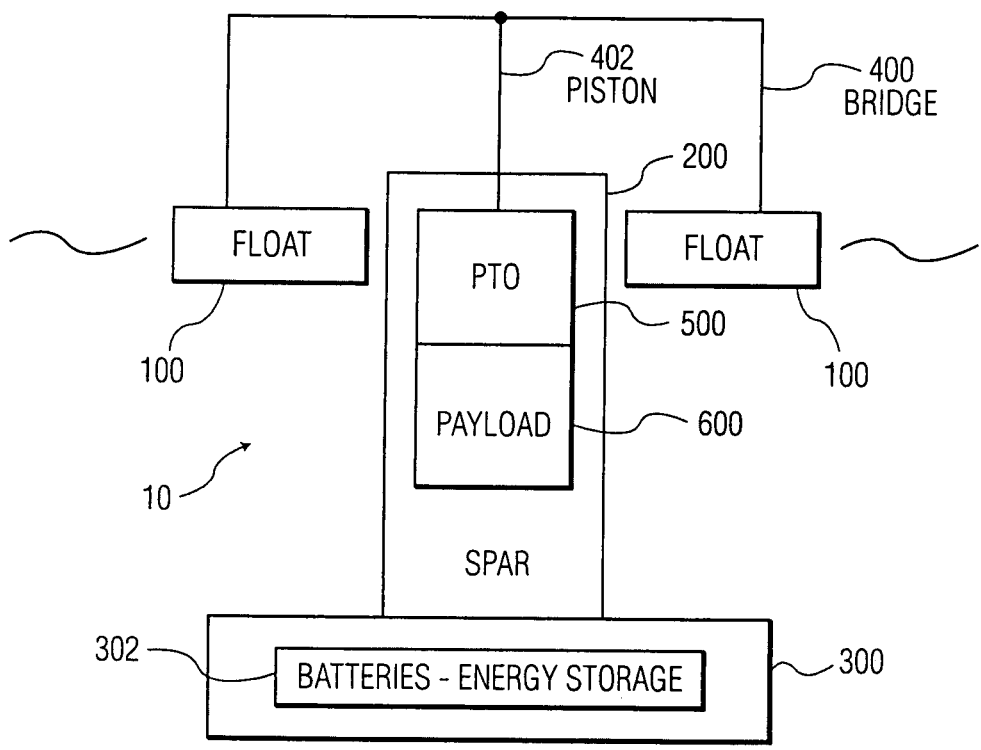
FIG. 1 is a simplified isometric diagram of a WEC which may be used to practice the invention.

In FIG. 1, the float 100 is coupled to a bridge structure 400 to which is fixedly attached a thrust (push) rod 402 which is coupled to a power take off (PTO) housing 500 disposed within the spar 200. As the waves impinge on the WEC, the float moves up and down with the spar being either relatively stationary or moving generally out of phase, or delayed, with respect to the float. The motion of the float which corresponds to, and is generally in phase with, the wave motion is translated into a substantially linear (up/down) motion of the thrust rod 402 which is communicated to designated portions of the PTO system 500 which is essentially connected between the float and spar (see FIG. 2). The PTO system may be any suitable device for converting the relative motion of the float and spar into a desired form of energy (power). In one embodiment the PTO system may be of the type generally referred to as a rack and pinion. Portion(s) of the PTO (e.g., rack) are connected to and move with the float and portion(s) of the PTO (e.g., stator or generator) are connected to and move with the spar. Any known PTO system may be used to practice the invention, the rack and pinion being only one example of a suitable PTO. For example, the PTO may take the form of a Flywheel, or of Hydrogen storage/generation (via saltwater electrolysis) or of compressed gas.

Figure 1A:
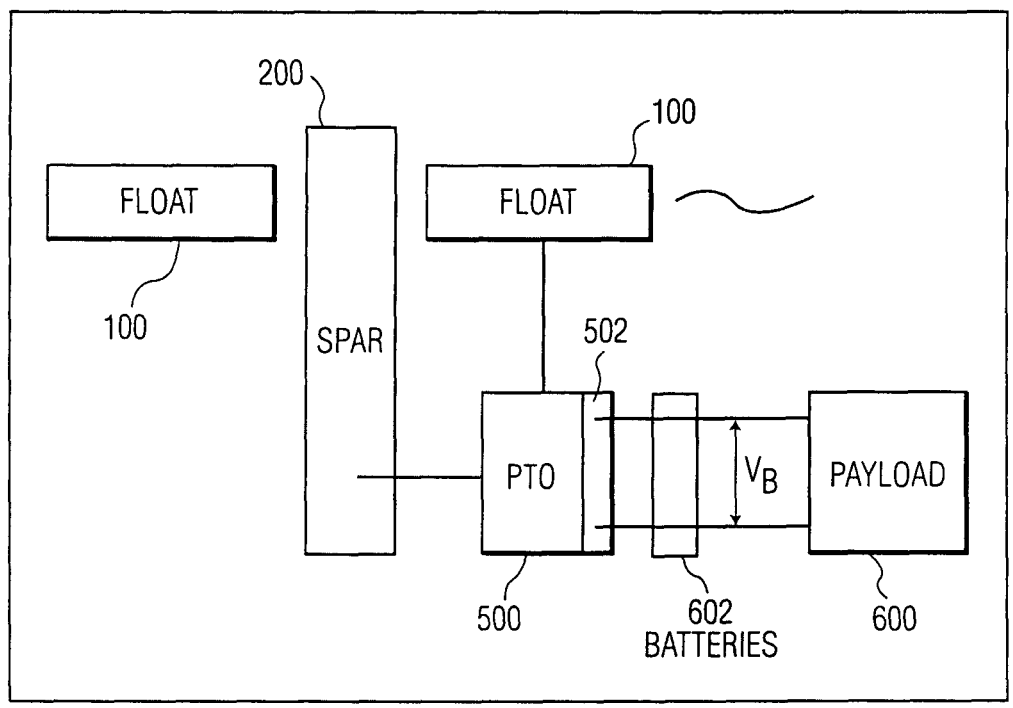
FIG. 1A is a highly simplified block diagram of a WEC supplying power to a payload suitable for practicing the invention.

In FIG. 1A, the PTO is shown to have an output port 502 at which the electric output of the PTO is produced. The output port 502 is shown connected to payload 600 and batteries 602. This is a highly simplified drawing intended to illustrate that the PTO can provide the power to charge the batteries and to power the payload.

Figure 1B:
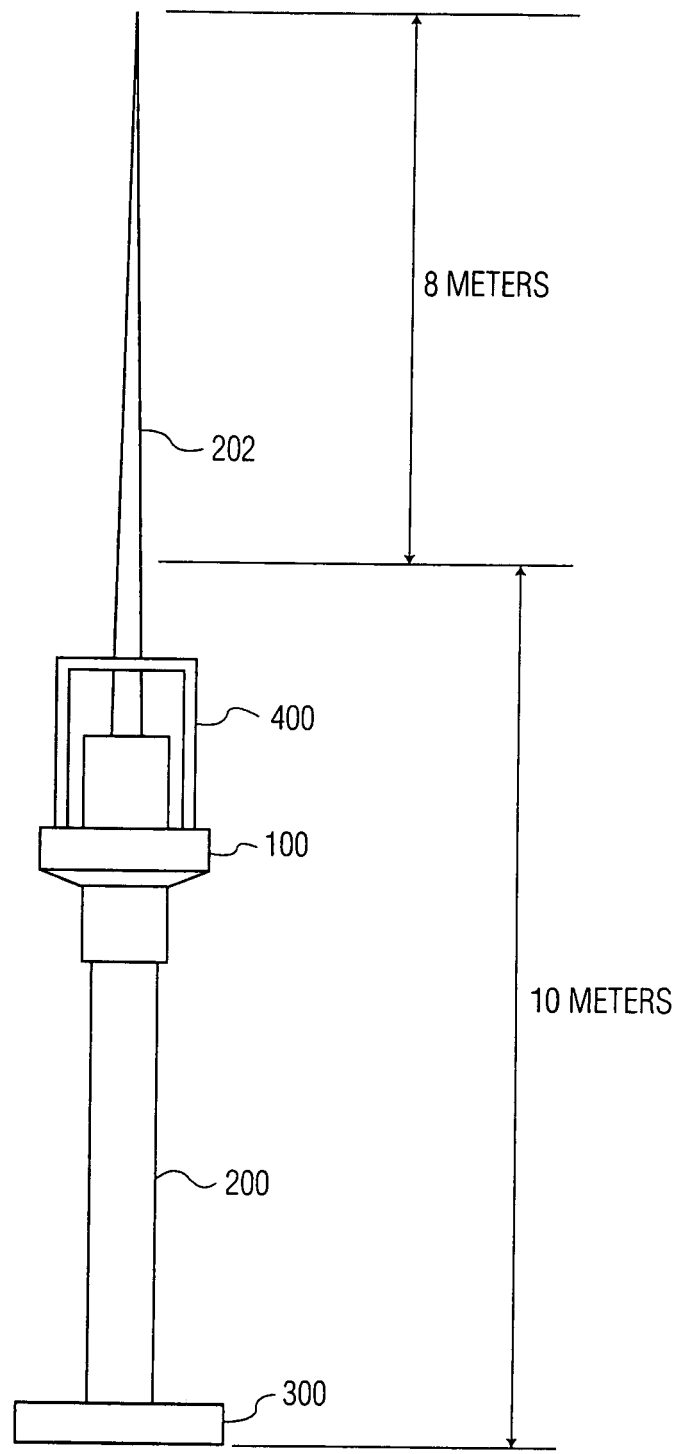
FIG. 1B is a highly simplified isometric diagram of a WEC on which is mounted an antenna.
Figure 2:
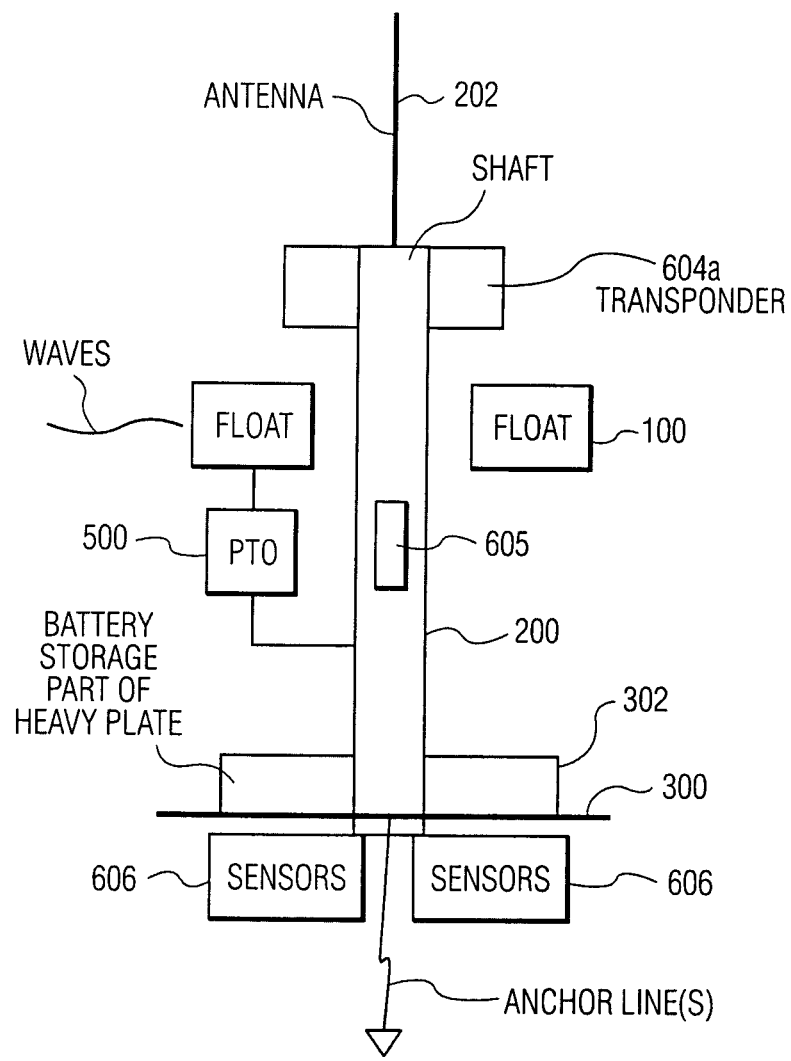
FIG. 2 is a simplified cross-sectional diagram of a WEC system embodying the invention.
Figure 3:
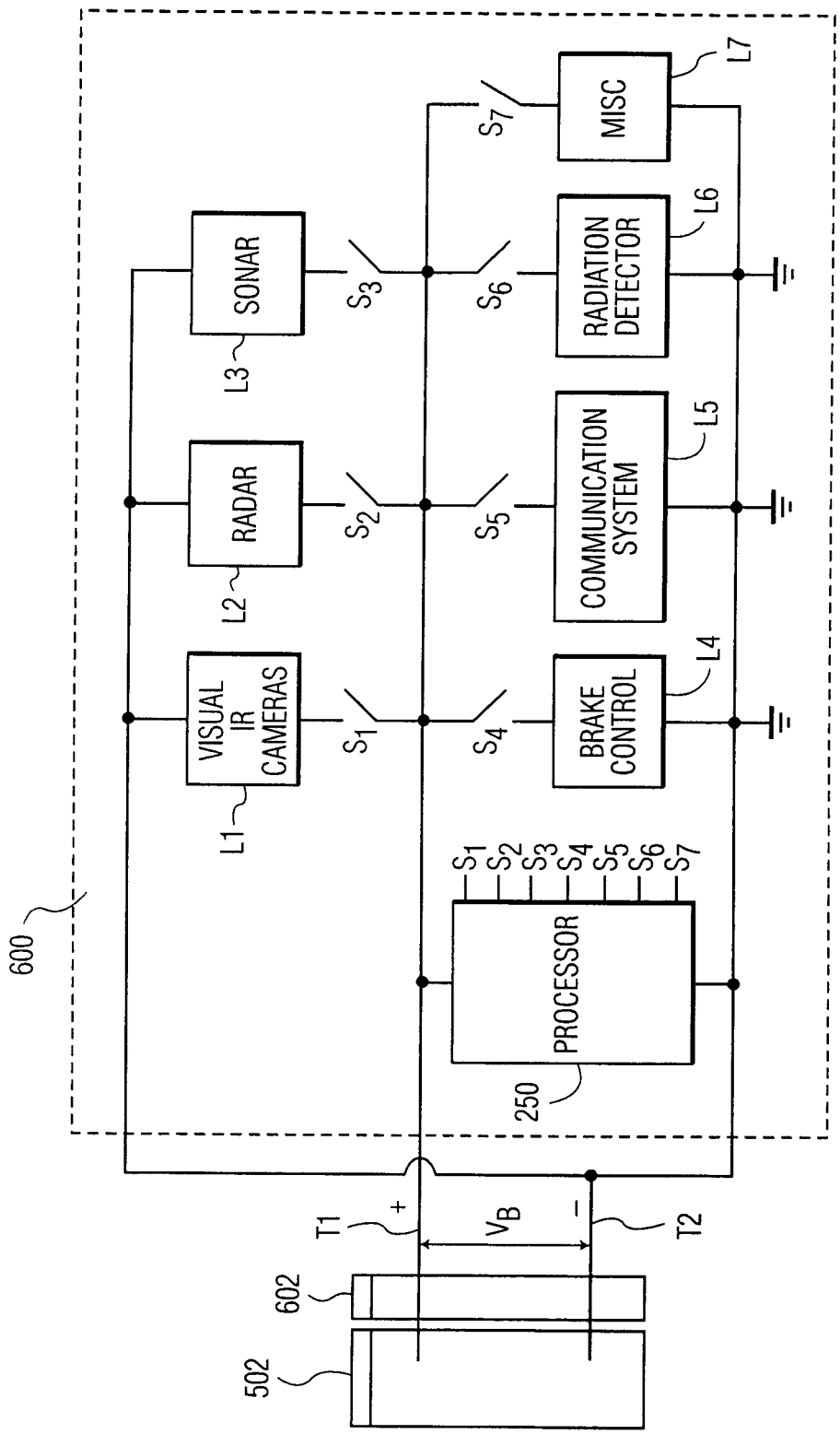
FIG. 3 is a simplified block diagram of a power distribution to various loads in accordance with the invention.

In FIGS. 1B and 2, the autonomous WEC is shown to include an antenna 202, and a payload which includes: (a) a transponder or transceiver 604; (b) an additional load 605; and (c) acoustic sensors 606. The sensors 606 may be part of a sonar system for detecting any underwater activity. The payload to be powered by the WEC may include many different pieces of equipment and devices, as shown in FIG. 3. For example, the payload may also include weather and/or surveillance sensing equipment, repeater equipment, (wave powered) distributed communications network; energy storage, batteries, (wave powered) sensor system payload options including radar system (HF, microwave), sonar systems, visual cameras, IR camera/detectors; and radiological detectors.

As already noted, an autonomous wave energy conversion device (WEC) for practicing the invention includes an arrangement of batteries 602 to store energy. The batteries 602 may be arranged in a redundant array for increased reliability and/or may be arranged in a modular array and/or to allow different types of batteries to be used (see FIGS. 1, 7 and 8). Also, as noted above, a major problem with the operation of the autonomous WEC device is that the battery pack (and or energy storage devices) used to power the transceivers and any other equipment may become depleted when the waves are of insufficient amplitude to produce the required power demand. When this occurs, the autonomous WEC is no longer useful.

In accordance with the invention, there is provided apparatus and methods for controlling the power distribution and power consumption to extend the useful life or time of the stored power/energy. FIG. 3 shows a system embodying the invention in which the payload 600 may include various loads (L1-L7) which are connected via respective switches (s1-s7) to the power source 502, 602; where power source 502 is the power output port of the PTO and 602 is a battery pack. This is a highly simplified drawing illustrating that any suitable power generating source driven by the WEC power generating system may be used to power the various loads. For ease of description the output power is applied between power terminals T1 and T2, with T1 arbitrarily assumed to be positive and T2 arbitrarily assumed to be negative (ground). In FIG. 3, terminal T1 is coupled:

(a) via a power switch S1 to load L1 which may be, for example, a visual and/or infrared (IR) camera;

(b) via a power switch S2 to a second load, L2 which may be, for example, a radar or atmospheric surveillance system;

(c) via a power switch S3 to a third load, L3, which may be, for example, a sonar or underwater surveillance system;

(d) via a power switch S4 to a fourth load, L4, which may be, for example, a brake control system for locking the WEC (i.e., for engaging the float and spar so they cannot move relative to each other);

(e) via a power switch S5 to a fifth load, L5, which may be, for example, a communication system;

(f) via a power switch S6 to a sixth load, L6, which may be, for example, a radiation detector system; and (g) via a power switch S7 to a seventh load, L7, which may be, for example, any miscellaneous system.

Each one of these loads is shown to have its own power switch. However, it should be understood that some loads may share a power switch. The switches are operated such that when they are closed power is applied to their respective loads. An aspect of the invention is that the switches may be controlled (opened and closed) to produce a variable duty cycle whereby the various loads can be powered for varying periods of time, as a function of climatic conditions and/or other predetermined operational conditions. FIG. 3 also shows a processor 250 directly connected across terminals T1, T2. The processor is programmed to generate the signals to control the turn on and turn off of the switches S1-S7. The processor/controller 250 is shown in FIG. 3 to be permanently connected across the power lines, assuming that this is necessary to ensure reliable operation. Any device requiring constant power would be so connected.

Figure 4:
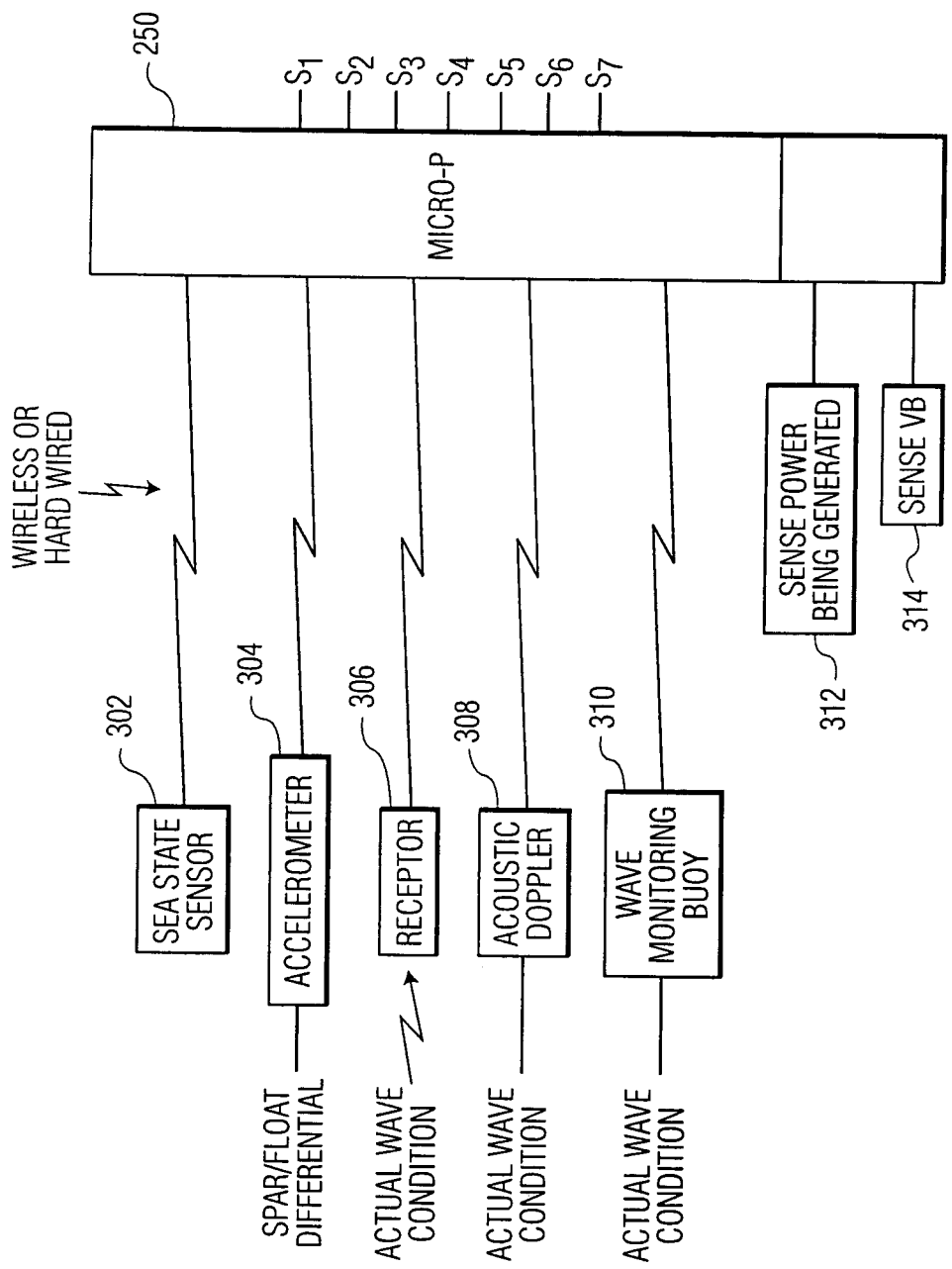
FIG. 4 is a highly simplified block diagram illustrating the use of a multiplicity of sensors for sensing various wave and power level conditions and producing sensor, signals applied to a processor programmed to control power distribution to the loads in accordance with the invention.

FIG. 4 is a simplified block diagram showing various sensor inputs to controller 250. The controller 250, which may be a microprocessor or mini-computer, is programmed to be responsive to selected ones of the inputs to produce signals controlling the turn on and turn off of power switches S1-S7 and to also control their duty cycle. The processor 250 is programmed to control the turn on and turn off of selected loads and to control the amount of time, or duty cycle, each load is powered. This can effectuate significant power savings since some devices, even when required to be operational, need not be powered 100% of the time to be operational.

FIG. 4 illustrates that many different sensors may be used to sense the condition of the waves and provide their signals to the controller 250. By way of example:

(a) a sea state sensor 302 sensing the differential movement between the spar and float may be used to provide signals to the controller; or (b) an accelerometer 304 responsive to the differential movement of the spar and float may be used to provide signals to the controller; or (c) a receptor 306 responsive to satellite or other external source may be used to provide signals pertaining to the waves (or any other system condition) to the controller; or (d) an acoustic doppler profiler 308 or a wave monitoring buoy may be used to supply signals pertaining to the waves (or any other system condition) to the controller 250; or (e) an auxiliary and/or external wave monitoring buoy 310 may be sued to sense the oncoming waves and feed a corresponding signal to the controller.

It should be noted that the above is by way of example only and that virtually any suitable type of wave sensor may be used to practice invention. For example, the sea state sensing mechanism may include data such as the "locking force" of the WEC's brake system (which, for the type of WEC shown herein, locks the motion of the spar and the float relative to one another). In addition, FIG. 4 shows that systems embodying the invention may include:

(a) apparatus 312 for sensing the amount of power being generated by the PTO; and/or (b) apparatus 314 for sensing the voltage level of the storage batteries; i.e., sensing their state of charge.

The controller 250 is programmed to process selected ones of the input signals and in turn produce output signals for controlling the power switches S1-S7, as discussed above.

The signals from the various sensors can be supplied directly or via wireless to the controller. Although not explicitly shown, it should be appreciated that sensors and their signals may be coupled or supplied to the processor/controller 250 via a wireless connection, or via hard wire connection, or using a communications to shore-based network. Also, some signals, such as wave conditions, or commands may be supplied by an external (remote or satellite) weather/wave forecast.

Power consumption is managed to enable extended operation of the payload for as long as is possible under adverse climate condition. This is achieved by selectively connecting and/or disconnecting selected loads (particular devices and/or equipment) from the WEC's power source. In accordance with one aspect of the invention the controller 250 is programmed to operate the WEC system in different operational modes to manage power consumption as a function of climatic conditions (e.g., wave amplitude) and/or selected external conditions (e.g., need for quiet for some surveillance conditions). As already noted, in recognition of the problem which may arise if the power consumption is greater than power production, applicants incorporated sensors to, among others, sense the status (energy or voltage level) of the batteries, the conditions of the waves (sea states) and for a control system for power management to extend energy storage (battery) life. Therefore, the system includes sensors to continuously monitor the state of charge in the energy storage subsystem so that the power to the payload can be modulated to a duty cycle of less than 100% if the energy stores become so depleted. This may occur, for example, during extended periods (e.g. one or two weeks) of low wave energy.

The system includes a power management scheme which allows the excess extracted power to be stored in an energy storage subsystem which can later supply the payload with power for cases when the wave climate is not sufficient to supply power to the payload. Therefore, it is required that the system continuously monitors the renewable power generated by the WEC. This allows for a relatively continuous amount of power to be supplied to the payload for an indefinite duration.

Figure 5:
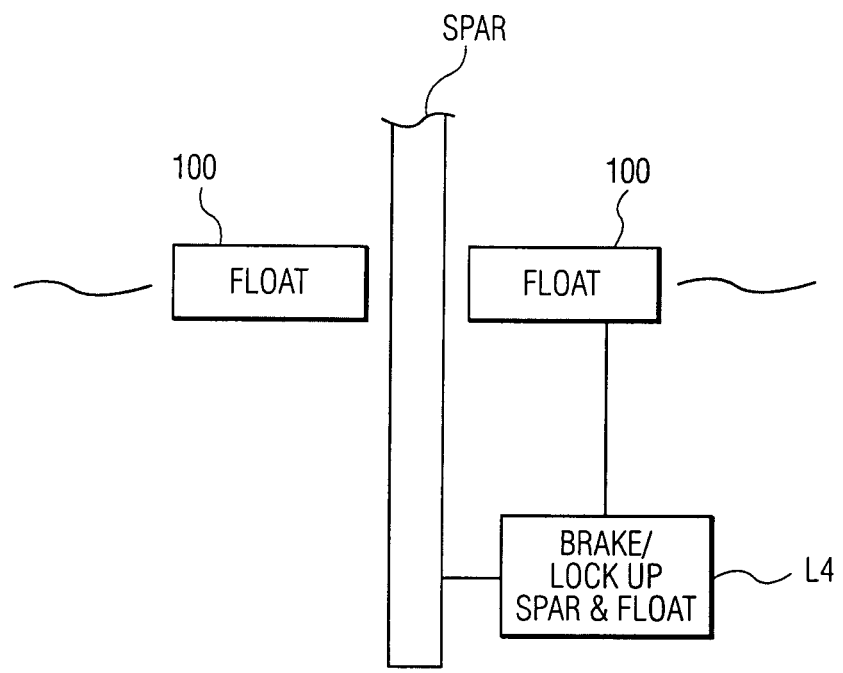
FIG. 5 is a highly simplified block diagram illustrating conditions for a lock up mode of a WEC in accordance with the invention.

Referring to FIG. 5, there is shown a highly simplified block diagram of apparatus including "Lock-up" apparatus L4 coupled between the float and the spar, which, when activated, functions to lock the float and the spar so that there is no significant movement between them. The "lock-up" or "brake" apparatus is activated for at least the following conditions:

1—For the condition of very low amplitude waves, if the relative movement between the spar and float causes more power dissipation than can be generated, power will be saved by activating the "lock up";

2—For the condition of very high amplitude waves (storm condition) threatening the destruction of the WEC by tearing the spar, float and PTO apart. This ensures the survivability of the buoy/WEC although it produces a condition where power may be drawn from the batteries, although no power is being produced; and 3—There may be times where it is desirable and/or necessary to lock-up the WEC so It does not emit any detectable signals. For example, the autonomous WEC may include sensors to detect selected underwater conditions (e.g., it may be used for surveillance). To perform the detection correctly (or for the WEC not to be detected) it may be desirable and/or necessary to lock the spar and float.

Figure 6:
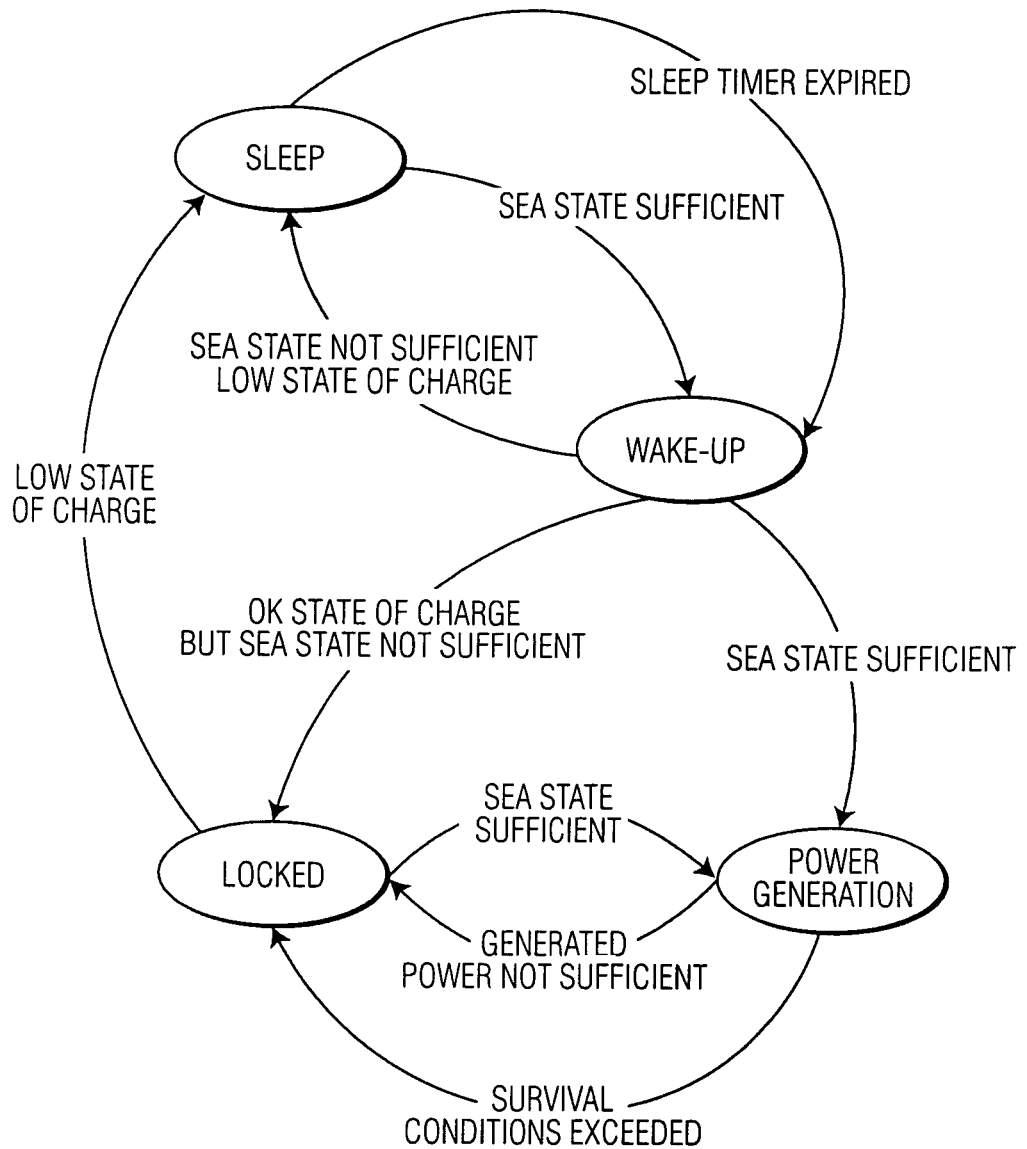
FIG. 6 is a diagram showing several operating modes of a renewable energy power producing system in accordance with the invention.

In accordance with the invention various conditions of the waves and the existing power level or power being produced is sensed (see FIG. 4) for operating the WEC system in either a power generating mode, a sleeper mode, a wake up mode or a lock down mode in order to control the power usage and extend the useful operating life of the autonomous WEC. The sensed information is sent to a processor/controller 250 which is programmed to determine whether it is worth expending overhead power to attempt to generate net power output to the payload and/or battery bank. Depending on the sensed information the system is designed to be placed in different modes Referring to FIG. 6, there is shown a method of operating the WEC such that the control algorithm takes the form of a state controller and operates in one of 4 states as described below. Other implementations of this algorithm, including more operating states, may be implemented, but the disclosed algorithm describes certain preferred features. The control algorithm can be implemented by programming the micro processor 250 or any other suitable controller. The 4 states may include the following:

1—Power Generating State—This is the anticipated power generating state which is programmed to occur when the wave climate (amplitude and/or oscillations of the waves) is sufficient to overcome the incremental "housekeeping" loads necessary to perform power generation. The WEC is maintained in this state when the sensed wave amplitudes are above a first level defining the "calm" condition and below a second level defining the "storm" condition. In this state the WEC is fully operational and power may be delivered to the load(s) based upon a real time measurement of the battery's state of charge. Generated power in excess of that needed to drive the loads is stored in the energy storage subsystem (e.g. batteries), shown, for example, in FIGS. 1 and 7, or shed in a power shedding device ("dump" resistors) for cases where that energy storage is saturated (see FIG. 8). The power generating state is maintained until the waves have an amplitude which decrease below the first (calm) level or until their amplitude exceed the second level (storm conditions). For the calm condition, the amplitude of the waves is too low and the power generated by the WEC power is insufficient to justify maintaining "housekeeping" loads. For the storm condition, it is not possible to maintain the relative motion of the float and spar within their design limits without exceeding the force or power ratings of the WEC's power take off device (PTO). In either of these cases, the system is designed to enter the Locked State (described above and also noted below).

2—Sleep State—The sleep state is the condition into which the WEC is set when battery voltage is extremely low and absolute minimum power consumption is desired. The sleep state is programmed to occur when (and to last as long as); (a) the sensed amount of charge in the batteries or the sensed power being generated is below a predetermined level; and/or (b) the sensed wave conditions (e.g., as sensed by sea state sensors) indicate the amplitudes of the waves are below a predetermined level; and/or on start up or as a default condition. In the sleep state, very little power is consumed by the operating system; power drainage is limited to some selected critical systems such as a communications link and a sea state sensor which monitors the present wave conditions. Typically, in the sleep mode, the WEC is also operated in a lock-up condition preventing relative motion of the WEC bodies. The sea state sensors monitor wave conditions so that the system can be woken up if the amplitudes of the waves justify transitioning to the power generation state. When in the sleep state the processor 250 activates a sleep timer (not shown) which periodically wakes the system up so that it can intermittently transmit its status to an external on-shore command center via a radio. Thus, in response to sensed signals, the processing unit is programmed to determine whether the WEC system should be placed in this mode.

3—Wake-up State—The Wake-up state is a transitory state whose purpose is to determine if the system was awakened due to sufficient wave conditions or due to elapsing of the sleep timer. If wave conditions are not sufficient to justify WEC power generation, then a report is sent to an external command center indicative of the wave climate and WEC status via a radio link and the system is returned to the Sleep State. If wave conditions are sufficient to justify power operation, then the system is transitioned to the power generation state. No power is drawn by the payload in this state and relative motion of the WEC remains locked.

4—Locked State—In the locked state, there is no relative motion of the WEC's bodies. For the type of WEC 10 shown herein, the spar and float do not move relative to each other. However, the spar and float can move in tandem. This state is programmed to occur when:

(a) the sensed wave amplitudes exceed a predetermine level (i.e., storm conditions). This functions to prevent the float from potentially moving uncontrollably and ensures the survivability of the WEC; or (b) there is insufficient power being generated to justify all incremental "hotel" loads associate with Power Generation; or (c) Any time the sea state is not sufficient to generate power while the power storage subsystem has an acceptable state of charge In this state power will be delivered to the payload until the state of charge of the energy storage subsystem is so low that the system must enter the sleep state to preserve its energy reserves to maintain its autonomous operation. In this state, the system also continuously monitors its sea state sensor to monitor the wave climate to determine conditions when it becomes appropriate (safe) to return to the power generation state. In response to sensed signals, the processing unit is programmed to determine whether the system should be placed in a "lock-up mode" when wave conditions are insufficient and the power drain would be excessive. In the lock up mode most of the WEC systems are shut down.

As noted above there are conditions when the WEC is placed in a lock-up state independent of the conditions of the waves. The autonomous WEC of the invention may be used to perform very important security functions. Sensors (not shown) mounted on the top side of the float 100 and/or on the bridge 400 may be used to sense any activity in the space above and around the WEC. Sensors 606 may be mounted along the submerged portion of the spar 200 or the heave plate 300. Sensors 606 may be acoustic sensors (or any appropriate device) to sense any activity in the waters around the WEC 10 and provide signals to alert a user. Under certain circumstances, to focus more accurately on the source of received (acoustic) signals from the sensors it may be desirable to lock-up the WEC so as to make the buoy as quiet as possible to improve acoustic sensor performance.

Figure 8:
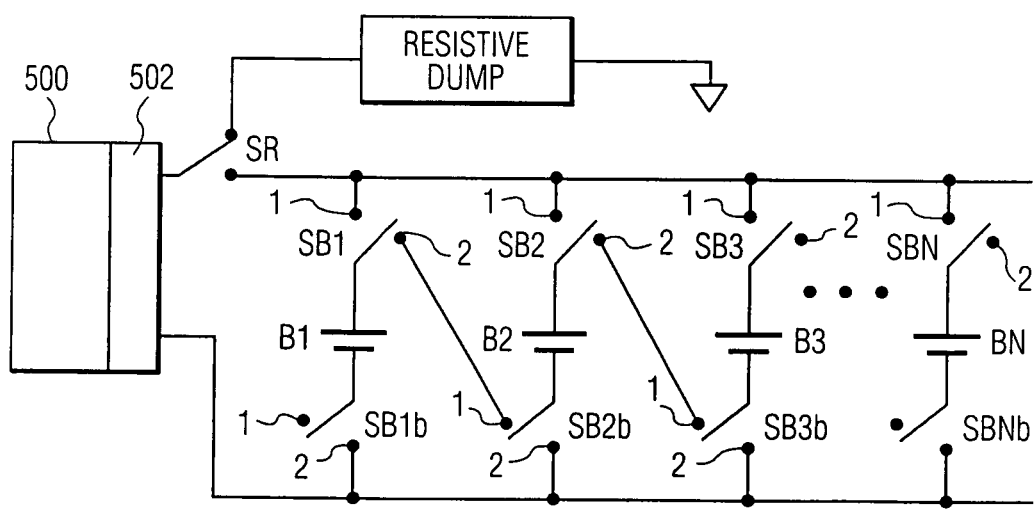
FIG. 8 is a diagram illustrating an arrangement for enabling different batteries to be independently charged and for enabling them to be operated in series (stacked) or in parallel.

FIG. 7 illustrates that the batteries 602 may be deployed in a battery storage 302 located within an heave plate. The batteries could also be located within the spar. FIG. 8 is intended to show that the batteries (B1-BN) may be charged in parallel or serially or separately and that they may also be operated in parallel or stacked to function to produce a higher serial output. This may be accomplished by operation and control of switches SB1-SBN and switches SB1b-SBNb. In the event of an overcharge a switch SR may be activated to dump (dissipate) any excess charge.

The invention has been illustrated using a type of WEC which may be referred to as being of the dual absorber design (spar and float move relative to one another to produce electricity from harnessing their relative motion). However, it should be appreciated that the invention is applicable to the operation of any other type of WEC. This includes, but is not limited to, WECs described as being of the mass on spring design (essentially sealed from the outside, where an internal mass moves up and down to produce power).

The invention has been illustrated for the energy conversion device being a wave energy conversion device (WEC) and for a system in which power consumption can be selectively controlled ("nursed") to extend the useful life of the power storage system. This is a preferred device for this application. However, the energy conversion device may take other forms.

Systems embodying the invention also include circuitry for sensing the voltage level of the batteries, if the battery voltage falls below a certain level and/or if the sensed conditions of the waves indicates that the battery power can no longer operate the WEC, then an alarm system is activated to alert remote locations that the WEC/buoy can no longer provide or support the called for functions (e.g., surveillance, and/or relaying information).

What is claimed is:

1. Apparatus, intended to be deployed in a body of water, including:

a wave energy converter (WEC) system responsive to the amplitude of waves in said body of water for producing electrical power at an output power port;

a payload comprised of a multiplicity of different electronic and electromechanical loads, switch means coupled between the output power port of said WEC system and selected ones of the different loads for selectively powering said selected ones of the different loads; and control means for controlling the switch means and the amount of power supplied to and consumed by the loads said control means including a controller, responsive to the amount of electric power being produced, said controller programmed to control the turn-on and turn off of the switch means to reduce the power dissipated by selected loads when the power being produced is below a predetermined level.

2. Apparatus as claimed in claim 1, wherein said apparatus is a self contained autonomous WEC-buoy and wherein said switch means includes a plurality of switches connected between the output port and selected loads.

3. An apparatus as claimed in claim 1, wherein said WEC system includes first and second bodies which move relative to each other in response to the waves and a power take off device (PTO) coupled between the first and second bodies for generating said electric power at said output power port and wherein the amount of power produced at the output port is a function of the amplitude of the waves.

4. An apparatus as claimed in claim 3, wherein said controller is programmed to control the turn on and turn off of the switch means to reduce the power dissipated by selected loads when the power being produced is below a predetermined level and wherein the controller also includes means for inhibiting movement between the first and second bodies when the amplitude of the waves exceeds a predetermined level.

5. An apparatus as claimed in claim 3, wherein in order to reduce power consumption under adverse power producing conditions said control means includes means for inhibiting the relative motion between the first and second bodies for at least one of the following conditions:
(a) when the amplitudes of the waves are below a predetermined level so that the relative movement between the two bodies would cause more power dissipation than can be generated;
(b) when the amplitude of the waves exceeds a predetermined level threatening the destruction of the WEC; or
(c) to lock-up the WEC in order to minimize the emission of noise signals.

6. An apparatus as claimed in claim 3, wherein, in order to reduce power consumption under adverse power producing conditions, said control means includes means for selectively operating the WEC system in any one of the following states:
(a) a power generating state when the waves have an amplitude above a first value and below a second value; where for said first value the WEC system generates sufficient power to overcome a minimum value of power dissipation which the WEC tends to dissipate and said second value is a predetermined level which if exceeded threatens the destruction of the apparatus;
(b) a sleep state in which very little power is consumed by the operating system whereby power drainage is limited to selected critical loads;
a transitory wake-up state; or
(d) a lock up state in which there is no relative motion between the first and second bodies.

7. An apparatus as claimed in claim 3, wherein said control means includes at least one of:
(a) sensing means for directly sensing the amplitude of the waves impinging on the apparatus and producing sensing signals indicative thereof;
(b) sensing means for indirectly sensing the amplitude of the waves impinging on the apparatus and producing sensing signals indicative thereof;
(c) sensing means for sensing the output power available at the output port and producing sensing signals indicative thereof;
(d) sensing the voltage level at the output port and producing sensing signals indicative thereof; and
means responsive to the sensing signals for processing the sensing signals and controlling the switch means.

8. An apparatus as claimed in claim 3, wherein said apparatus includes a battery system connected to said output port and wherein said loads coupled via said switch means to said output port include at least one of a radar system, a camera system, a sonar system, a brake control system, and a communication system.

9. Apparatus intended to be deployed in a body of water in which waves of varying amplitude are produced and wherein said apparatus includes a wave energy converter (WEC) system for producing an amount of electric power at an output port which is a function of the amplitude of the waves, said electric power for powering a payload located on or about the apparatus, where the payload includes a multiplicity of different electronic, electrical and electro mechanical devices, said apparatus comprising:

switch means coupled between the output port and selected ones of the electronic, electrical and electro mechanical devices; and control means responsive to the output power being produced for controlling the turn on and turn off of the switch means and reducing the amount of power supplied to, and consumed, by said selected ones of the electronic, electrical and electro mechanical devices when the electric power being produced is below a predetermined level.

10. An apparatus as claimed in claim 9, including energy storage means for storing the energy produced by said WEC system;

and said control means responsive to the output power being produced for controlling the switch means and the amount of power supplied to, and consumed, by the loads for reducing the power consumed by selected ones of the of the electronic, electrical and electro mechanical devices when the electric power being produced is below a predetermined level and for reducing the usage of the stored energy.

11. An apparatus as claimed in claim 9, wherein said WEC system includes: a) first and second bodies which move relative to each other in response to the waves; and b) a power take off device coupled between the first and second bodies for generating electric power at an output port and the amount of power produced at the output port is a function of the relative motion between the first and second bodies which in turn is a function of the amplitude of the waves.

12. An apparatus as claimed in claim 11, wherein one of the electro mechanical devices is a brake system coupled between the first and second bodies for selectively inhibiting motion between these two bodies.

13. An apparatus as claimed in claim 12, wherein said control means includes a controller for activating the brake system and inhibiting motion between the first and second bodies when:

(a) the amplitudes of the waves is below a predetermined level;
(b) the amplitude of the waves exceeds a predetermined level threatening the destruction of the WEC; and
(c) it is desired to reduce the emission of noise signals by the WEC.

14. An apparatus as claimed in claim 9, wherein there is included energy storage means coupled to the output port, and wherein said control means includes at least one of: (a) sensing means for directly sensing the amplitude of the waves impinging on the apparatus and producing sensed signals indicative thereof; (b) sensing means for indirectly sensing the amplitude of the waves impinging on the apparatus and producing sensed signals indicative thereof; (c) sensing means for sensing the output power available at the output port and producing sensed signals indicative thereof; and (d) sensing means for sensing the level of stored energy and producing sensed signals indicative thereof; and wherein said control means includes a controller for processing the sensed signals and generating signals controlling the turn-on and turn-off of the switch means.

15. An apparatus as claimed in claim 14, wherein the electronic, electrical and electro mechanical devices include at least one of a camera system, a radar system, a sonar system, a brake control system, a communications systems, a radiation detector.

16. An apparatus as claimed in claim 14, wherein said control means includes a processor for processing the sensing signals with the processor being programmed to be responsive to the sensed signals to control the switch means to operate the renewable operating system and the loads in different operating modes as a function of the amplitude of the waves.

17. An apparatus as claimed in claim 14, wherein the WEC system is operated in any one of the following modes:
(a) a standard power generating mode when the amplitude of the waves and the corresponding power being produced is above a first value and below a second value;
(b) a lock-up mode in which the first and second bodies of the WEC system are inhibited from moving with respect to each other;
(c) a sleep mode in which very little power is consumed and the WEC is also in the lock-up mode; and
(d) a wake up mode which is an intermediate condition to determine whether to keep the system in the sleep mode or switch the WEC system to a standard power generating mode.

18. Apparatus, intended to be deployed in a body of water subjected to waves of varying amplitude, including: (a) a wave energy converter (WEC) system responsive to the amplitude of the waves in said body of water for producing electrical power at an output port including power storage means coupled to said output port for storing produced electrical power;
(b) a multiplicity of different electrical and electromechanical loads;
(c) switch means coupled between the output power port and selected ones of the different loads; and
(d) control means responsive to the electric power being produced for controlling the turn on and turn off of the switch means and the amount of power supplied to, and consumed by, the loads for reducing the payload's power requirements to match a drop in the system's energy capture in order to extend the power stored in said power storage means and the operability of the payload under adverse wave conditions.

19. Apparatus as claimed in claim 18 wherein said WEC system can operate autonomously; optimizing its settings to the wave climate and manage its available energy reserves.

20. Apparatus as claimed in claim 18 wherein said switch means includes switches which are controlled to [r] selectively connect and disconnect selected loads from the WEC's power port for operating the WEC system in different operational modes to manage power consumption as a function of selected climatic conditions and selected external conditions.

21. Apparatus as claimed in claim 18 wherein one of said loads is an on-board satellite radio to allow the apparatus to communicate with a remote command center so the operational status of the WEC system can be ascertained and, if necessary, it's autonomous operating parameters over-ridden.

22. Apparatus as claimed in claim 21 wherein the on-board radio also allows for communication between the sensors and responders and the command center; for controlling the payload as well as receiving telemetry data.

23. Apparatus as claimed in claim 18 wherein said WEC system includes first and second bodies which move relative to each other in response to the waves and a power-take-off device (PTO) coupled between the first and second bodies to convert their relative motion into electrical energy; and wherein said payload includes a brake system to selectively inhibit the relative motion between the first and second bodies.

24. Apparatus as claimed in claim 23 wherein the brake system is activated for the following reasons and under one of the following conditions: (a) to minimize the system's overhead electrical draw for periods where low wave activity do not justify full operation of all of the WEC's sub-systems; (b) to eliminate acoustic noise which may interfere with a selected sensor's operation; (c) to lock the float and spar under storm conditions.

25. Apparatus as claimed in claim 24, wherein the brake system is activated in response to signals generated by selected sensors in response to wave conditions.

26. Apparatus as claimed in claim 25 wherein said power storage means includes batteries arranged in a redundant topology so that the failure of one battery in the array does not compromise the system's ability to deliver power to the payload.

27. Apparatus as claimed in claim 25 wherein said first body is a spar and the second body is a float; and wherein said spar has a heave plate connected to a submerged portion of the spar; and wherein said power storage means includes batteries arranged about said heave plate to increase its mass.

28. Apparatus as claimed in claim 18 wherein the control means includes an on-board controller including a program which embeds all control algorithms necessary for autonomous operation, control of the payload and communication with a command center; and wherein the control means includes means for adjusting the payload's duty cycle for power delivery to less than 100%.

29. Apparatus as claimed in claim 18 wherein said control means includes sea state sensors to monitor the wave climate which, along with a control algorithm, allow the WEC system to autonomously determine an optimum configuration of the WEC system to maximize the net energy extracted from the waves.

30. Apparatus as claimed in claim 29 wherein said WEC system includes at least first and second moving bodies and wherein the sea state sensors may include or be one of the following:

a) a force sensor disposed between a braking device and one or more of the WEC's moving bodies to monitor the force communicated from wave action through the brake; or
b) a displacement sensor disposed between two or more of the WEC's moving bodies to monitor their relative motion; or
c) an accelerometer mounted on one or more of the WEC's floating moving bodies to determine the motions induced on the body by wave action; or
d) A method of monitoring the back EMF voltage of the generator without active control to determine the level of wave activity; or
e) Other conventional wave sensors deployed in the vicinity of the system;

and wherein data from these sensors are processed to control the switch means.

* * * * *